June 28, 1949.
H. T. SPARROW
TEMPERATURE CONTROL APPARATUS
FOR CABINS OF AIRCRAFT
Filed June 6, 1946
2,474,441
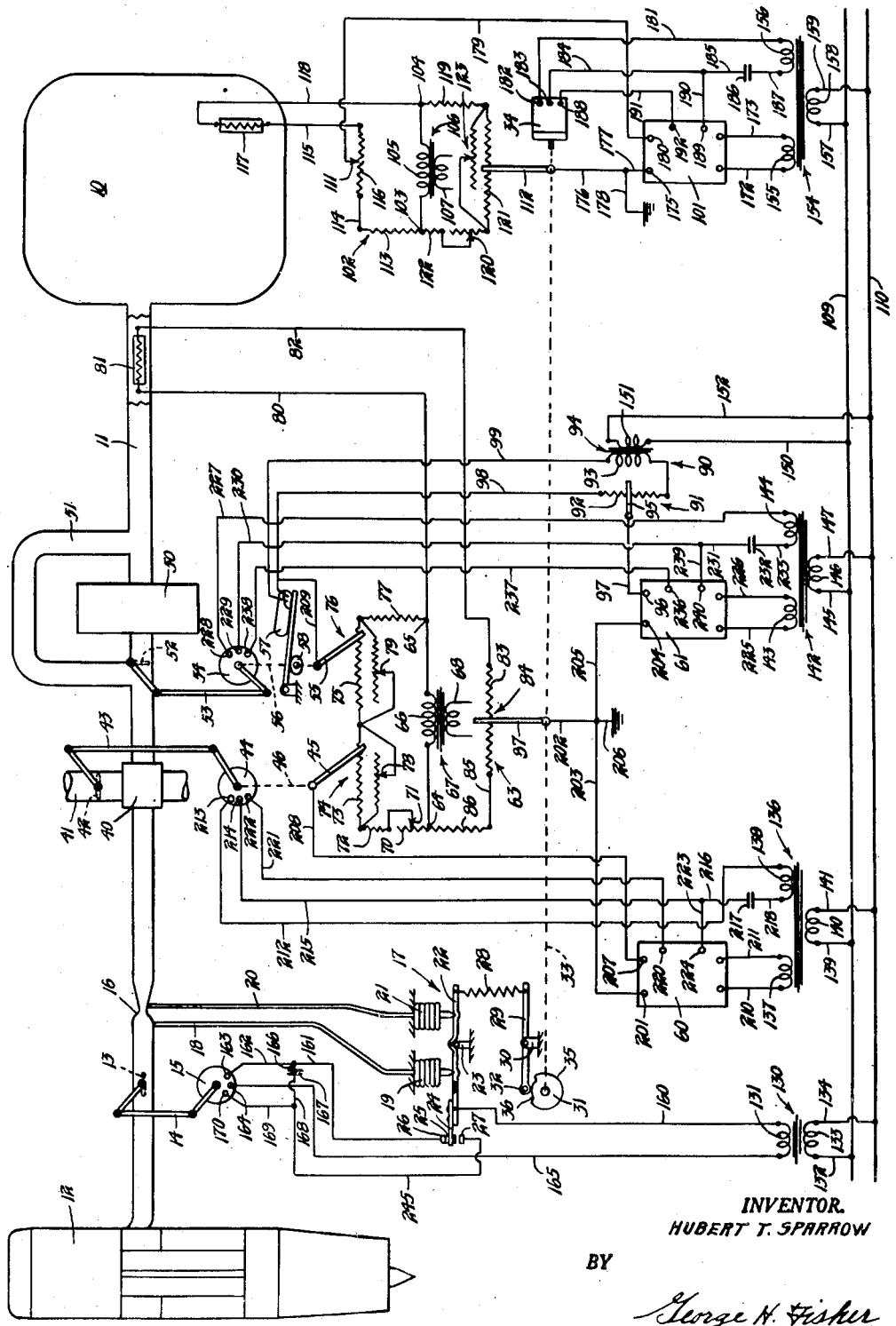
INVENTOR.
HUBERT T. SPARROW
BY
George N. Fisher
ATTORNEY Patented June 28, 1949

2,474,441

UNITED STATES PATENT OFFICE 2,474,441

TEMPERATURE CONTROL APPARATUS FOR CABINS OF AIRCRAFT

Hubert T. Sparrow, Minneapolis, Minn., assignor to Minneapolis-Honeywell Regulator Company, Minneapolis, Minn., a corporation of Delaware Application June 6, 1946, Serial No. 674,748

17 Claims. (Cl. 62—6)

The present invention relates to apparatus for controlling temperature in the cabin of an aircraft supplied with ventilating air under pressure.

The ventilating air for the pressurized cabin of an airplane propelled by a jet engine or a gas turbine is conveniently taken from the compressor of said engine or turbine. This air is under more than adequate pressure and because of its heat of compression, no other heaters are needed. However, because the heat of compression of this air is generally excessive for the needs of the cabin, cooling must be provided to keep the temperature within the desired limits. Although air for cooling is plentiful, it is preferable to minimize the use of aftercoolers and the like because of their interference with the aerodynamic characteristics of the airplane. For this reason, refrigerating means are provided for cooling the air to be used for cabin ventilation, with aftercooler means being provided to supplement the said refrigerating means.

It is therefore a principal object of this invention to provide means for properly controlling aftercooler and refrigerating means used for cooling air supplied to an aircraft cabin.

It is also an object to provide means for controlling a plurality of temperature changing means in a predetermined sequence.

More specifically, it is an object to provide means for controlling aftercooler means and refrigerating means in such manner that the principal cooling load is carried by the refrigerating equipment and the aftercooler means is used to supplement the refrigerating means.

Additionally, it is an object to provide means for controlling the aftercooler means and refrigerating means so that light cooling loads will be handled by the aftercooler means, ordinary cooling requirements will be met by the refrigerating means, and large cooling loads will be handled by both the refrigerating means and the aftercooler means.

Further, it is an object to provide control apparatus of a sort wherein a plurality of devices are so controlled that one device is first operated to meet a demand; upon further demand a second device is used and assumes the full load, the first device being made inoperative, and upon a still further increase in load, both devices are used.

When the air for cabin ventilation and pressurizing is taken from the compressor of the power plant for aircraft, it is obvious that the said power plant is deprived of the air with a consequent loss of power. It is thus desirable to use no more air for the cabin than is actually needed.

It is therefore another object to provide temperature control apparatus for an aircraft cabin wherein the volume of the air supplied to the cabin is kept to a minimum consistent with adequate ventilation and proper temperature control.

It is an additional object to provide apparatus for controlling the inflow of air to an aircraft cabin wherein the said apparatus is adjusted by temperature control means.

It is also an object to provide apparatus for maintaining the rate of air inflow to a structure at a predetermined value under most conditions but wherein the said value may be increased to meet extreme conditions of either heat or cold in the said structure.

These and many other objects will become apparent upon a study of the following specification and drawings:

The single figure of the drawings shows schematically the present invention as applied to an aircraft equipped with a jet engine.

In the drawing, aircraft cabin 10 is supplied with ventilating air through conduit 11 which receives air from the compressor of a jet engine shown schematically at 12. The air delivered to cabin 10 is exhausted through pressure regulating valve means, not shown. To control the rate of air flow through duct 11, a butterfly valve or damper means 13 is provided which is operated through suitable linkage means 14 by reversible motor means 15. Motor means 15 is a conventional two-phase geared motor of the sort wherein a suitable capacitor is connected in series with one or the other of the windings to cause reverse operation. Preferably, this motor is also equipped with internal limit switch or stop means to limit the operation of the motor in either direction.

Venturi means 16 is located downstream of valve means 13 and serves as a limiting device and a sensing device to determine the rate of air flow. A differential pressure controller 17, connected in controlling relation to motor means 15, is actuated in response to the pressure differences existing across the entrance and the throat of the Venturi means 16. Tube 18, connected to duct 11 at the entrance to venturi 16, is connected to expansible bellows means 19 of controller 17, and tube 20, connected to the throat of venturi 16, is connected to bellows means 21 of controller 17. Bellows means 19 and 21 coact in opposing relation with lever means 22 which is pivoted about knife edge pivot means 23. At its left extremity, lever means 22 includes an electrically insulated portion 24 and movable contact means 25, the said contact means 25 coacting with stationary contacts 26 and 27. A tension spring 28 is connected to the right extreme of lever 22 and is adjusted by lever means 29, pivoted at 30, and adjustably operated by cam means 31 coacting with a follower 32 at the opposite end of lever means 29. Cam means 31 is carried on shaft 33 of motor means 34, to be described. Cam means 31 includes a high portion 35, a low portion 36, and suitable inclined portions connecting the high and the low portions. The function of this cam will be later described.

The air taken from the compressor of a jet engine, for example, may be compressed to several atmospheres and consequently is at a relatively high temperature. To cool the air flowing through conduit 11 to cabin 10, an aftercooler means 40 is provided. Aftercooler means 40 comprises a simple heat exchanger having two sets of passages, conduit 11 connecting with one set of passages and cooling air from conduit 41 flowing through the other set of passages. This cooling air is obtained through a suitable ram air inlet, not shown, and is discharged at a point where it will have the least effect on the aerodynamic characteristics of the airplane. The flow of cooling air through aftercooler 40 is controlled by a suitable damper means 42 connected by a suitable linkage 43 to motor means 44. Motor means 44 is a geared two phase motor similar to motor means 15, but differing therefrom in that it also drives a follow-up potentiometer wiper 45 by shaft 46.

In addition to aftercooler means 40 for cooling the air delivered to cabin 10, refrigerating means 50, in the nature of an expansion turbine, is provided. The refrigerating means per se forms no part of the present invention, hence it has not been shown, but it may be mentioned that an expansion turbine provides cooling by permitting a compressed gas, such as the air in the present case, to expand through the same with work being done by the turbine. The work or energy available from the turbine may be used for increasing the rate of air flow through aftercooler 40, for driving auxiliary apparatus, or it may be wasted. To provide simple means for controlling the cooling effect of refrigerating means 50, bypass means 51 is provided. A diverting damper or valve means 52 controls the flow of air through either bypass means 51, refrigerating apparatus 50, or proportions the air flow through both of the said means. Damper means 52 is operated by linkage 53, which in turn is operated by geared motor means 54. Motor means 54 is similar to the aforesaid motor means 15 and 44 but it not only drives potentiometer wiper 55 through shaft 56, but also operates switch means 57 by means of a cam 58 carried on said shaft 56.

Motor means 44 is controlled by amplifier means 60 and motor means 54 is controlled by amplifier means 61. Amplifier means 60 and 61 may be of any conventional sort suitable for controlling a motor and wherein the phase relation of the output voltage is similar to the phase of the input signal. With this sort of an amplifier, when there is no input signal, there is no output signal, but when there is an input signal of one phase relation, the output signal will be of like phase relation and will energize one winding of motor 44 and cause operation of the motor in one direction, the other winding being energized from a line supply, as will be pointed out later. If the input signal should be of opposite phase, then the output signal would likewise be of opposite phase, the winding of the motor would be energized in a different manner and reverse operation of the same would take place. As an example of amplifiers of this sort, reference is made to the copending application of Albert P. Upton, Serial No. 437,561, filed April 3, 1942, now Patent No. 2,423,534 granted July 8, 1947. As noted, motor means 54 is controlled by amplifier means 61, and the remarks made relative to amplifier 60 and motor 44 hold equally well for amplifier 61 and motor means 54.

Amplifiers 60 and 61 are controlled by an electrical network generally designated as 63. Network 63 is energized through input terminals 64 and 65 connected to secondary 66 of transformer 67. Primary winding 68 of transformer 67 is connected to line wires by suitable connections, not shown. The network circuit is, in series from input terminal 64, resistor 70, adjustable wiper 71 coacting with said resistor 70, fixed resistor 72, resistor 73 of rebalance potentiometer 74, resistor 75 of rebalance potentiometer 76, fixed resistor 77, input terminal 65, wire 80, temperature responsive resistor, or thermistor, 81 located in the discharge portion of duct 11, wire 82, resistor 83 of potentiometer 84, wire 85, and fixed resistor 86 back to input terminal 64. An adjustable resistor 78 is connected in parallel with resistor 73 for adjusting the potential drop across the same and a similar adjustable resistor 79 is connected in parallel with resistor 75. Potentiometer wiper 87 coacting with resistor 83 is carried on and adjusted by shaft 33 in a manner to be described. Wiper 87 forms one output terminal of network 63 and wipers 45 and 55, coacting with resistors 73 and 75, respectively, form other output terminals of the network.

In addition to network 63, an overlap network 90 is also connected in controlling relation to amplifier 61. This network comprises a potentiometer 91 having its resistor 92 connected in series with switch 57 and secondary winding 93 of transformer 94 by wires 98 and 99. Wiper 95 of potentiometer 91 is connected to input terminal 96 of amplifier 61 by wire 97 and wire 98 is connected to wiper 55 by wire 209.

It has been previously noted that cam 31 and wiper 87 are each carried on shaft 33 which is driven by a motor means 34. Motor means 34 is a geared two phase motor similar in construction to the aforementioned motors 15, 44 and 54. Motor means 34 is controlled by a suitable amplifier 101 which is preferably similar to amplifiers 60 and 61, previously described.

Amplifier means 101 is controlled by an electrical network circuit 102. Input terminals 103 and 104 of network 102 are energized by secondary winding 105 of transformer 106. Primary winding 107 of said transformer is connected to line wires 109 and 110 by suitable connections, not shown. The upper left-hand branch of the network comprises input terminal 103, resistor 113, wire 114, and the portion of resistor 116 lying to the left of adjustable contact 111. The upper righthand branch of the network comprises the portion of resistor 116 lying to the right of contact 111, wire 115, temperature responsive resistor, or thermistor, 117, wire 118 and input terminal 104. The lower right-hand branch of the network comprises fixed resistor 119, and the portion of resistor 121 lying to the right of wiper 112. The lower left-hand branch of the network comprises the portion of resistor 121 lying to the left of wiper 112, adjustable resistor 120 for determining the control point of the network, and fixed resistor 122 back to input terminal 103. Adjustable contact 111 forms one output terminal of network 102 and wiper 112, carried by the aforesaid shaft 33, forms the other output terminal of the network. A rheostat 123 is connected in parallel with resistor 121 so that the potential across resistor 121 can be varied.

To provide electrical energy for the various components of the present system, line wires 109 and 110 are connected to a suitable source of alternating current. Transformer 130 has its secondary winding 131 connected to motor means 15 and has its primary winding 132 connected to the line wires by the circuit: line wire 109, wire 132, primary winding 133, wire 134 and line wire 110. Transformer 136 has a pair of secondary windings 137 and 138 for amplifier 60 and motor means 44, respectively, and its primary winding 140 is energized by the circuit: line wire 109, wire 139, primary winding 140, wire 141 and line wire 110. Transformer 142 has secondary windings 143 and 144 for energizing amplifier 61 and motor means 54, respectively, and its primary winding 146 is energized as follows: line wire 109, wire 145, primary winding 146, wire 147 and line wire 110. The primary winding 151 of transformer 94 is energized by the circuit: line wire 109, wire 150, primary winding 151, wire 152, and line wire 110. Transformer 154 is similar to transformers 136 and 142 and has secondary windings 155 and 156 for energizing amplifier 101 and motor means 34, respectively, while the primary winding 158 is energized by the circuit: line wire 109, wire 157, primary winding 158, and wire 159 to line wire 110.

To more fully explain the function of the present apparatus, reference is made to the following schedule of operation.

*Operation*

In describing the operation of the present apparatus, it is convenient to make certain assumptions. For instance, it may be assumed that the airplane is on the ground, the ambient temperature is about 73 degrees, and therefore, since the apparatus is not functioning, the temperature at thermistor 81 and thermistor 117 is also approximately 73 degrees. As a convenient starting place for the description, it will be assumed that the various controlled elements are each in the position shown in the drawing. Now, without starting the power plant of the airplane, assume that line wires 109 and 110 are suitably energized by alternating current.

Before going further with this description, it will be noted that the apparatus is energized by alternating current and that network circuits are used to control the present amplifiers. It is well-known that circuits of this sort control their associated amplifiers by signals of one phase when the network is unbalanced in a particular way and by signals of an opposite phase when the networks are unbalanced in the opposite direction. However, it is rather confusing to describe the present network circuits and the like in terms of their phase relations and, as it has been found much more convenient to describe the present circuit in terms of the potentials existing at the time of a half cycle, this description shall proceed on that basis. Therefore, rather than describe the phase of a signal from network 63 or 102, it will be discussed in terms of its positive or negative potential, it being kept in mind that this is merely a convenient manner of describing the actual phase relations which are present. At the instant of the half cycle in question, it may be assumed that the left sides of networks 63 and 102 are positive relative to the right sides. Further, the lower end of resistor 92 may be considered positive relative to the upper end of the same.

It was previously noted that the temperature in cabin 10 of the aircraft was about 73 degrees, hence the temperature at thermistor 117 may be assumed to be at that value. If it now be further assumed that the resistance values of network 102 are such that wiper 112 must be at the extreme left of resistor 121 to balance the network when the temperature at 117 is 80 degrees and the wiper must be at the extreme right of resistor 121 to balance the network when the temperature at 117 is at 65 degrees, then with a temperature at 117 of 73 degrees and with wiper 112 at about the midpoint of resistor 121, it appears that network 102 is balanced. Although network 102 is supplying no signal to amplifier 101, it is noted that wiper 112 is connected by wires 176 and 177 to input terminal 175 of the amplifier, wire 176 also being connected to ground through wire 178. Further, adjustable contact 111 is connected by wire 179 to the other input terminal 180 of the amplifier. The amplifier 101 receives its energizing current from transformer secondary winding 155 through wires 172 and 173 and the motor 34 is energized from the amplifier and from secondary winding 156 by the circuits: winding 156, wire 181, motor terminal 182, terminal 183, wire 184, wire 185, capacitor 186, wire 187 and winding 156. This energizes the winding of the motor connected between terminals 182 and 183. The other winding of the motor is energized by the circuit: output terminal 189 of the amplifier, wire 190, wire 184, terminal 183, terminal 188 and wire 191 to the other output terminal 192 of the amplifier. It is thus noted that the first mentioned winding of motor 34 is constantly energized through capacitor 186 by winding 156 but the other winding of the motor is effectively energized only when there is an output from amplifier 101. Further, the direction of rotation of motor 34 depends on the phase relation or, in this description, the potential of the amplifier output. Since only one winding of motor 34 is energized, the motor does not operate and wiper 112 remains in its mid-point adjustment. It is noted that motor 34 not only adjusts wiper 112 but that it also adjusts wiper 87 associated with network 63 and cam 31 associated with the airflow control apparatus, the said cam and wiper 87 being carried on shaft 33 of the said motor. With wiper 112 at an intermediate position, cam 31 is also adjusted to an equivalent intermediate position and therefore follower 32 of lever 29 is on low portion 36 of the said cam.

With differential pressure controller 17 adjusted for a low rate of air flow by cam 31, it is nevertheless noted that there is no air flow at this time to control. With no air flow through duct 11 and venturi 16, the pressure in bellows 19 and 21 is equal hence lever 22 is rotated in a clockwise direction by spring 28. This brings movable contact 25 in engagement with contact 26 and energizes motor 15 by the circuit, transformer secondary winding 131, wire 160, insulated portion 24 of lever 22, contact 25, contact 26, wire 161, wire 162, motor terminal 163, terminal 164, and wire 165 back to the secondary winding 131. This energizes the winding connected between terminals 163 and 164. The other winding of the motor is energized, starting from wire 161, by the circuit: wire 161, wire 166, capacitor 167, wire 168, wire 169, terminal 170, terminal 164 and wire 165 which is common to the two windings. It is noted that capacitor 167 is in the circuit which energizes the winding connected between terminals 170 and 164. With both windings of motor 15 energized as above described, the said motor is caused to rotate in a clockwise direction but, since damper 13 has already been rotated in a clockwise direction to its full open position, further rotation is prevented by the limit means of the motor.

With line wires 109 and 110 energized, transformer 67 of network 63 is likewise energized due to connections, not shown, from primary winding 68 to the said line wires. As before noted, the energization is such that input terminal 64, during the half cycle, is positive relative to input terminal 65. In addition, amplifier 60 is furnished energizing current from transformer secondary winding 137 by wires 210 and 211, and amplifier 61 is likewise energized from transformer secondary winding 143 by wires 225 and 226. In addition, motor means 44 is energized by the circuits: transformer secondary winding 138, wire 212, motor terminal 213, terminal 214, wire 215, wire 216, capacitor 217, wire 218 and winding 138; the other winding of the motor is energized from amplifier 60 by the circuit: output terminal 224, wire 223, wire 216, terminal 214, terminal 222, wire 221 and output terminal 220. Also, motor means 54 is energized by the circuits: transformer secondary winding 144, wire 227, motor terminal 228, terminal 229, wire 230, wire 231, capacitor 232, wire 233 and winding 144; the other winding of the motor is energized by the circuit: output terminal 236 of the amplifier 61, wire 237, terminal 238, terminal 229, wire 239, wire 239 and the other output terminal 240 of amplifier 61. If it now be assumed that wiper 87 is at approximately the mid-point of resistor 88, and that network 63 is so adjusted and calibrated that wiper 87 must be at the extreme left of resistor 88 to balance the network when thermistor 81 is at 40 degrees, and must be at the extreme right of resistor 88 to balance the network when thermistor 81 is at 250 degrees, it then appears, due to the mid-point adjustment, that the network will be balanced as shown if the temperature at 81 is about 125 degrees. It was noted, however, that the temperature at 81 is about 73 degrees hence it follows that network 63 is not balanced. With thermistor 81 relatively cool, and therefore its resistance relatively low, the potential of input terminal 65 is closer to that of wiper 87 than it would otherwise be. Therefore, since the potential difference between input terminal 64 and 65 remains the same at all times both wipers 45 and 55 become more positive relative to wiper 87 as wiper 87 approaches terminal 65 in potential. As the network is originally adjusted so that the potential at wiper 55, ignoring network 90, would be the same as the potential at wiper 87 when the network is balanced, with wiper 55 in the position shown, then it follows that wiper 45 will always be more positive than wiper 55. With wiper 45 positive relative to wiper 87, a positive signal is impressed on amplifier 60 by the circuit: input terminal 201 of amplifier 60, wire 203, wire 202, wiper 87, network 63, wiper 45, wire 208 and input terminal 207 of the amplifier. It is noted that input terminal 201 of the amplifier is grounded through wires 203 and 206. With the motor winding connected between motor terminals 213 and 214 being energized directly from transformer secondary winding 138, and with the other winding of the motor being energized from amplifier 60 when there is a signal impressed on the said amplifier, it is noted that there is energization of the other winding of the motor due to the functioning of the amplifier, hence motor 44 tends to rotate in a counter-clockwise direction. However, it is noted that damper 42 has already been rotated to its maximum counter-clockwise position hence further rotation is prevented by stop means associated with the motor. Although wiper 55 is obviously negative relative to wiper 45, it is also noted that under the conditions stated that the said wiper 55 is positive relative to wiper 87 and therefore a positive signal is impressed upon amplifier 61 by the circuit: input terminal 204 of the amplifier 61, wire 205, wire 202, wiper 87, network 63, wiper 55, wire 209, wire 98, the upper portion of resistor 92, wiper 95, wire 97 and input terminal 96 of the amplifier. It is noted that wiper 55 is not directly connected to amplifier terminal 96 but rather is connected through network 90. Since switch 57 is in a position wherein its contacts are closed, network 90 is energized and, as it was previously stated, when network 90 is energized wiper 95 is positive relative to wiper 55. The wiper 95 is adjusted on resistor 92 so that the said wiper is positive relative to wiper 55 by an amount equal to the potential drop across resistor 75 plus a predetermined percentage, such as about 15 per cent, of resistor 75. Therefore, although wiper 55 is positive relative to wiper 87, the potential impressed on input terminal 96 is considerably more positive relative to the wiper due to network 90. As motor 54 was previously noted to be energized from transformer winding 144 and amplifier 61 in such fashion that any sufficient output voltage from amplifier 61 would cause operation of the motor, it is now noted that there is such an output from the amplifier hence motor 54 tends to operate in a counter-clockwise direction. However, since damper 52 is already in its maximum counter-clockwise position, further operation of the same in counterclockwise direction is prevented by stop means associated with the motor means 54.

If the power plant of the aircraft is now started air is bled from the compressor of the same by conduit 11. With the parts in the position shown a maximum rate of airflow will be permitted and there will be no cooling by either the aftercooler 40 or the expansion turbine 50. The first effect due to this airflow will be noticed at the airflow control apparatus. With a relatively high rate of flow now taking place through venturi 16, the pressure in bellows 19 will be considerably increased over that in bellows 21 and, when the pressure in bellows 19 is sufficient to overcome the efforts of bellows 21 and spring 28, lever 22 will be rotated in a counterclockwise direction and contacts 25 will disengage from contact 26. When the differential pressure is sufficient to move contacts 25 into engagement with contact 27, motor means 15 will be energized by the circuit: winding 131, wire 160, insulated portion 24 of lever 22, contacts 25, contact 27, wire 245, wire 161 motor terminal 170, terminal 164, wire 165 and winding 131. The other winding of the motor will be energized by a similar circuit, starting from wire 245 as follows: wire 168, capacitor 167, wire 166, wire 162, terminal 163, terminal 164 and common wire 165. This energization of the motor means 15 differs from that by which the motor was previously energized in that the capacitor 167 is now in the circuit energizing the winding connected between terminals 164 and 163. This causes motor means 15 to operate in the opposite, or counterclockwise direction thereby moving damper 13 in a closing direction. As damper 13 moves in a closing direction, the airflow across venturi is diminished and thereby decreases the differential pressure affecting controller 17. When the differential pressure diminishes sufficiently, spring 28 will be effective to move contacts 25 out of engagement with contact 27 and thereby deenergize the motor and prevent further adjustment of damper 13 until the said contacts are moved into engagement with either contact 26 or 27 to cause further adjustment of the said damper. Assuming that damper 13 will be operated in accordance with controller 17 to maintain the desired rate of air flow, it may now be recognized that not only is an airflow established to cabin 10 through duct 11 but also heat is being supplied due to the heat of compression possessed by the compressed air.

Assuming for the moment that the temperature in cabin 10 has not been changed by this heated air being supplied to the same, it will be noted that the most immediate effect of the temperature change in the air is to increase the temperature of thermistor 81. As the temperature of thermistor 81 increases, and therefore its resistance is increased, wiper 87 becomes more positive relative to input terminal 65 and also to wipers 45 and 55. Therefore, the unbalance of the network is decreased.

If it now be assumed that the aircraft starts its flight and is climbing rapidly, and still assuming that the temperature in cabin 10 remains at approximately 73 degrees, it will now be noted that the high output being demanded from the power plant 12 results in a considerable compression of the air by the compressors of the engine. This compression also results in considerable heat being added to the air and, with damper 13 controlling the rate of flow to the cabin, the heat input to the cabin is increased due to the high temperature of the air. However, the first effect of the high temperature is at thermistor 81 which is increased in temperature, and its resistance therefore further increased. As the temperature of thermistor 81 rises above the control point of 125 degrees, wiper 55 becomes negative relative to wiper 87. However, since input terminal 96 is positive relative to wiper 55 by a predetermined amonut due to network 90, there is no immediate response by amplifier 61 to the changed conditions of balance of network 63. As the temperature at 81 continues to increase and wiper 55 becomes more and more negative relative to wiper 87, the positive signal impressed on input terminal 96 continues to diminish. When the unbalance of the network 63, due to the increasing resistance of thermistor 81 is high enough to normally require movement of wiper 55 to the extreme left of resistor 75 to rebalance the same, any further unbalance of the network due to further increase in resistance at 81 will result in wiper 45 becoming negative relative to wiper 87. Assuming that this condition does take place, and the resistance of 81 does increase sufficiently to cause wiper 45 to become negative to wiper 87, a negative signal is impressed on amplifier 60 by a circuit previously traced and the motor 44 is operated in a direction reverse from that previously described. The resulting clockwise direction of operation of motor means 44 moves damper 42 in an opening direction and permits cooling air to flow through aftercooler 40 to lower the temperature of the air flowing into cabin 10 through duct 11. While motor means 44 is adjusting damper 42 in a clockwise direction, it also adjusts wiper 45 to the left across resistor 73 to render the same less negative with respect to wiper 87. When this movement is sufficient, and wiper 45 is no longer negative with respect to 87, then the signal to the amplifier stops, the motor stops and there is no further adjustment of damper 42. If the initial opening movement of damper 42 is sufficient to provide enough cooling of the air passing through the aftercooler 40 to prevent a further rise in temperature at 81, the apparatus will remain stabilized. Assume that the aircraft is operating at near full power, however, and the temperature at 81 continues to rise so that wiper 45 tends to be driven further across resistor 73. While network 63 has thus become more and more unbalanced due to the increasing resistance at 81, wiper 55 has become more and more negative with respect to 87. When wiper 55 becomes more negative with respect to wiper 87 then wiper 95 is positive with respect to wiper 55, then the signal added by network 90 is overcome and a negative signal is impressed on input terminal 96 from wiper 55. When this happens, amplifier 61 energizes motor means 54 in a manner to cause rotation opposite in direction from that previously described. This causes motor means 54 to operate damper 52 through linkage 53 in a clockwise direction and permits air flow through expansion turbine means 50 with a consequent diminishing of the flow through bypass 51. This also causes a leftward movement of wiper 55 across resistor 75 and, in addition, causes rotation of cam means 56 which tilts mercury switch 57. As any tilting of mercury switch 57 opens its contacts and thereby deenergizes network 90, the additive positive signal which previously made terminal 96 of the amplifier considerably positive with respect to wiper 55 is now removed. Instead of a small negative signal being impressed on amplifier 61 which was merely the difference between the total negative unbalance between wiper 55 and wiper 87 and the positive potential existing between wiper 55 and wiper 95, the said negative signal now reaches the full value of that existing between wiper 55 and wiper 87. This signal will be of such value that motor means 54 will not be able to immediately rebalance the signal by moving 55 across resistor 75 and damper 52 will tend to be driven to its opposite extreme. Considering this description on a step by step basis, damper 52 would be driven to its opposite extreme and damper 42 would remain in its previous partly open position. As a matter of practice, however, as damper 52 is moved to close off bypass 51 and permit full flow of air through expansion turbine 50, the said turbine is put into operation at a high level of capacity and immediately effects a reduction in air temperature at thermistor 81. With the air temperature at 81 being reduced, the resistance of thermistor 81 is decreased and network 63 thereby becomes less unbalanced. Only a relatively small decrease in unbalance of network 63 is required to again make wiper 45 positive with respect to wiper 87 and thereby energize amplifier 60 in a manner to again cause rotation of motor means 44 in a clockwise direction until such operation is prevented by stop means of the motor. This causes closing of the damper 42 and thereby transfers all the cooling load to the expansion turbine means 50. With a lower temperature at 81 and with wiper 55 being advanced across resistor 75 to the left, the network 63 not only becomes less unbalanced but the signal impressed on amplifier 61 is diminished due to the rebalancing effect of wiper 55 moving to the left across the said resistor 75. When wiper 55 moves sufficiently to reach the same potential as wiper 87, and therefore supply no signal to amplifier 61, motor means 54 will stop. Thus, if the expansion turbine means 50 is able to bring the temperature of thermistor 81 down to the desired value, it will now carry the entire cooling load.

If the heat of the air being delivered through duct 11 is so considerable that full operation of expansion turbine 50 is unable to effect a reduction in temperature at 81, the network 63 will remain unbalanced and, assuming that the temperature and resistance of 81 continues to increase, wiper 45 will become (or remain) negative relative to wiper 87 thereby causing operation of motor means 44 in a clockwise direction to further open damper 42 and to drive wiper 45 to the left across resistor 73. As wiper 45 moves to the left across resistor 73, it becomes less negative relative to resistor 87 and may again rebalance the network in the manner previously described to remove the signal to amplifier 60. At whatever point this takes place, damper 42 will then remain in its adjusted position until there is a further change in temperature at thermistor 81. It is thus apparent that the initial cooling load is taken by a partial operation of heat exchanger 40, a further increase in heat load is taken by expansion turbine 50 with the turbine assuming all of the load if it is possible for it to handle the same and, if the load be excessive, both the expansion turbine 50 and aftercooler 40 may be used up to their full capacity for effecting a reduction in air temperature at 81.

During this discussion, it has been assumed that the temperature remained unchanged in cabin 10 of the aircraft. Further, since the temperature in cabin 10 remained unchanged, wiper 87 was maintained in its previous adjustment wherein it established a control point for network 63 of about 125 degrees. However, as the aircraft ascended, the heat load on cabin 10 would naturally tend to increase and the temperature therein therefore would tend to fall. As the temperature decreases in cabin 10, the resistance of thermistor 117 is diminished, the potential of output terminal 111 approaches that of input terminal 104 and therefore terminal 111 becomes negative with respect to wiper 112. This impresses a negative signal on amplifier 101 which causes energization of the amplifier winding of motor 34 in a direction to rotate wiper 112 to the right across resistor 121. As wiper 112 moves to the right across resistor 121, it becomes less positive with respect to terminal 111 to rebalance the network in a manner previously described. When completely rebalanced, no further signal is furnished the amplifier and rotation of motor means 34 stops. However, as wiper 112 is adjusted to the right across resistor 121, a new control point is established for network 63 by the adjustment of wiper 87 to the right across resistor 83, this occurring because wiper 87 is carried on shaft 33 of motor means 34.

Movement of wiper 87 to the right across resistor 83 tends to make it negative with respect to wipers 45 and 55 and thereby requires a higher temperature at 81 to restore the balance of the network. This results in a higher temperature of the air being delivered to cabin 10 to supply the needed heat due to the positive signals impressed on the amplifiers 60 and 61 causing operation of motors 44 and 54 in a damper closing direction as previously described. In addition to wiper 87 being adjusted to the right, cam 31 is also rotated but, due to the extent of low portion 36, there is no immediate effect on the adjustment of controller 17 and a minimum air flow is still maintained to the cabin. However, if the temperature in the cabin should continue to drop, network 102 would continue to become unbalanced causing rotation of motor means 34 to drive wiper 112 further to the right across resistor 121 to rebalance the said network. This would also cause wiper 87 to be driven further to the right across resistor 83 and still further increase the temperature of the air being delivered to the cabin. However, this cannot go on indefinitely for even though more heat may be needed in the cabin, there is a limit to the temperature of air that can be supplied to an inhabited cabin. Therefore, when the air temperature reaches a predetermined high value, such as 250 degrees, no further increase in temperature of the air is called for but continued rotation of shaft 33 brings high portion 35 of cam 31 under follower 32 to thereby increase the tension on spring 28 and thus increase the pressure differential that is to be maintained across venturi 16. The demand for an increased pressure differential by controller 17 results in an opening movement of damper 13 in a manner previously described with the result that a greater quantity of air at the maximum temperature is now being delivered to cabin 10 to meet the increased demand. The increased quantity of air is supplied to the cabin at the expense of engine output for it is noted that all the air used by the cabin is that which could otherwise be used by the power plant. With a proper design, it is only under adverse conditions that both maximum temperature and maximum air flow would be required to maintain a suitable temperature such as 65 degrees in the cabin of the craft.

If it be assumed that the conditions which brought on the extreme heat load in the aircraft cabin were those occasioned by a high speed flight at low altitude on a warm day, it is obvious that the conditions will tend to become less severe and the apparatus will be readjusted for less drastic conditions as the aircraft ascends to higher elevations and a cooler ambient.

Assuming that the aircraft has started a relatively slow descent from very high elevations, and the power requirements for the power plant have been very greatly diminished, the lessened operation of the power plant results in less compressing of the air and consequently less heat of compression being added to the same. Assuming that there had been sufficient heating of the air to require damper 42 of aftercooler 40 to be opened to some extent and expansion turbine 50 to be in full operation, the diminished air temperature, and as further cooled by aftercooler 40 and turbine 50 results in a considerable drop in temperature at thermistor 81. The effect of this is to unbalance the bridge in a manner to first close damper 42 and then to gradually close damper 52 in a manner previously described. While it was pointed out previously that a rather large unbalance of a network was required to move damper 52 from the position shown due to network 90, once the expansion turbine 50 is put in operation and with the contacts of switch 57 opened, damper 52 will be adjusted to control the entire cooling load as the load diminishes until the contacts of switch 57 are again closed when damper 52 reaches the position shown in the drawing, that is in which all the air passing through duct 11 is bypassed through 51. This method of operation of expansion turbine 50 works well in practice for, while a relatively large air flow is required to bring the expansion turbine into operation, a much smaller flow of air can maintain its operation.

If the aircraft should now descend to a relatively low elevation, where there is a relatively high ambient temperature, it is of course obvious that the heating load of the cabin will be greatly diminished. As the cabin temperature tends to increase, and the resistance value of termistor 117 increases, contact 111 becomes positive relative to wiper 112 and motor 34 is energized in a manner to drive wiper 112 to the left across resistor 121. As wiper 112 is moved to the left across resistor 121 to rebalance the network 102, it is of course obvious that wiper 87 will be moved to the left across resistor 83 and cam 31 will be rotated correspondingly. As wiper 87 is moved to the left across resistor 83, it establishes a progressively lower control point for network 63. Further, as it moves to the left, it tends to become positive relative to wipers 45 and 55 or, otherwise stated, the said wipers 45 and 55 tend to become negative relative to wiper 87. As noted, when negative signals are impressed on amplifiers 60 and 61 by wipers 45 and 55 respectively, motors 44 and 54 are controlled in a manner to provide more cooling. In addition, of course, the resulting movement of the motors tends to drive the wipers to the left across their respective resistors and thus rebalance the network. Should the temperature in cabin 10 tend to rise, in spite of the cooler air being delivered to the same, network 102 will again become unbalanced and cause operation of motor 34 in a direction to drive wiper 112 further to the left across resistor 121. As before noted, when the temperature in cabin 10 reaches 80 degrees, wiper 112 must be at the left extreme of resistor 121 to balance the network, and wiper 87 is driven to the left extreme of resistor 83. The demand for more cooling in cabin 10 thus requires a lower and lower temperature for the air being delivered to the said cabin. However, as it is not satisfactory to deliver air to the cabin at lower than 40 degrees, network 63 is so adjusted that the lowest control point that can be established by leftward movement of wiper 87 across resistor 83 is 40 degrees and further rotation of the said wiper causes no further decrease in control point. However, a further rotation of shaft 33 again advances high portion 35 of cam 31 under follower 32 and again tightens spring 28 of controller 17. This requires an added rate of air flow through venturi 16 to stabilize controller 17, hence it is noted that in the case of excessively high temperatures in the cabin, air will be furnshed to the same at the lowest feasible temperature and at an increased rate of flow in the same manner that maximum heat load conditions were met while on the heating cycles for the said cabin.

It is thus noted that the present apparatus controls the rate of air flow to an aircraft cabin to a minimum value under most conditions and varies the temperature of the air supplied to the cabin from a minimum required for a maximum cooling load to a maximum temperature such as required for a maximum heating load. The temperature of the air supplied to the cabin and the rate of flow of the same is determined by the temperature existing in the cabin; further, when the air at a minimum rate of flow and at a temperature within the desired range is unable to meet the requirements of the cabin, the rate of airflow is then increased to provide either more cooling or more heating as desired.

From a study of the present specification, it is obvious that many substitutions and equivalents are feasible. For instance, a mass air flow sensing device such as a Thomas type flowmeter may be used for controlling damper 13 instead of venturi 16 and differential pressure controller 17 as shown. In addition, motors and motor controlling amplifiers or other relay apparatus may be used instead of that shown and described, and shaft 33 may be directly rotated in response to cabin temperature conditions by a bimetal device, a bulb-bellows thermostat or the like. In addition, while the present apparatus has been specifically described in an application to an aircraft, it is equally applicable to any situation wherein there is adequate waste heat for heating and adequate cooling means available, such as may be found on a railway train or in ship use. Because of the wide range of equivalents and substitutions that can be made in the present system, I wish to be limited only by the appended claims.

I claim as my invention:

1. In an aircraft having a cabin, means for compressing air for said cabin, conduit means for conducting said air to said cabin, means responsive to the rate of air flow through said conduit means, valve means for controlling said air flow, said valve means being controlled by said rate of flow responsive means, said conduit means including aftercooler means, means for passing cooling air thorugh aftercooler means, means for controlling the said flow of cooling air, said conduit means also including refrigerating means downstream of said aftercooler means and bypass means around said refrigerating means, diverting means for controlling air flow through said refrigerating means and said bypass means, means responsive to the temperature of the air discharged from said conduit means into said cabin for controlling said cooling air controlling means and said diverting means in a sequence to lower the discharge air temperature wherein the aftercooler is first used for a portion of its capacity, the refrigerating means is next used with the aftercooler, followed by use of the refrigerating means alone and then by the refrigerating means and the aftercooler together, and means responsive to the cabin temperature for adjusting said rate of flow responsive means and said discharge air temperature responsive means.

2. In an aircraft having a cabin, means for compressing air for said cabin, the said compressing means adding heat to said air, conduit means for delivering the compressed air to said cabin, adjustable means for controlling the rate of flow through said conduit means, controllable aftercooler means for cooling the air flowing through said conduit, controllable refrigerating means for cooling the air flowing through said conduit means, adjustable means responsive to the temperature of the air discharged into said cabin for sequentially controlling said aftercooler means and said refrigerating means, and means responsive to the cabin temperature for adjusting said air flow controlling means and said discharge temperature responsive means.

3. In an aircraft having a cabin, means for compressing air for the said cabin, the said compressing means adding heat to said air, conduit means for delivering said air to said cabin, said conduit including aftercooler means, refrigerating means and bypass means around said refrigerating means, said aftercooler means being cooled by flow of cool air through the same, means for regulating the flow of said cool air, damper means for controlling the flow of compressed air through said refrigerating means and said bypass, adjustable means for regulating the quantity of air flow through said conduit means, means responsive to the temperature of the air discharged from said conduit means into said cabin for sequentially controlling said damper means and said cool air regulating means, motor means for adjusting said temperature responsive means and said quantity regulating means, and means responsive to the temperature of said cabin for controlling said motor means.

4. In control apparatus of the sort described, a first motor means for operating a condition changing device, a second motor means for operating another condition changing device, amplifier means for controlling said first motor means, amplifier means for controlling said second motor means, an electrical network capable of having its balance changed by variations in the condition changed by said devices, a pair of voltage dividing follow-up potentiometers each having a resistor, said network including the resistors of said pair of follow-up potentiometers in series, one of said follow-up potentiometers being adjustable by said first motor means and the other potentiometer being adjustable by said second motor means, means connecting said network including said one potentiometer in controlling relation to the amplifier for the first motor means, means including voltage adding means connecting said network and said other potentiometer in controlling relation to the amplifier for said second motor means, and switch means operable by said second motor means for controlling said voltage adding means.

5. In control apparatus, a plurality of devices to be controlled, an electrical network circuit for sequentially controlling said devices, said network including a plurality of potentiometers each adjustable by one of said devices, means for altering the sequence of control of said devices, and means operated by one of said devices for controlling said altering means.

6. In control apparatus, a plurality of motor means to be controlled, a potentiometer for each of said motor means, each of said potentiometers including a resistor, an electrical network circuit including the resistors of said potentiometers in series, means connecting said network and the respective potentiometers in control of each of said motor means, means interposed between one of said potentiometers and one of said motor means for opposing the controlling effect of said network on said one motor means, and switch means operable by said one motor means for controlling said interposed means.

7. In control apparatus, a plurality of devices to be operated in a predetermined sequence, amplifier means for controlling the energization of each of said devices, an electrical network including a potentiometer for each of said devices, said potentiometers each being adjustable in accordance with its respective device, means connecting each of said potentiometers in controlling relation to the amplifying means for the respective device, one of said connecting means including a resistor in series with said amplifying means and its controlling potentiometer, means for imposing a predetermined electrical potential across said resistor, and means operated by one of said devices for controlling said electrical potential.

8. In control apparatus, a plurality of devices to be operated in sequence, an electrical network for controlling said devices to operate in a predetermined sequence, an additional electrical network connected to the first named network for preventing one of said devices from operating in said predetermined sequence, and means operated by said one device for altering the effect of said additional network.

9. In control apparatus for a space, means for circulating a condition changing medium to the space, means for controlling the rate of said circulation, means including adjustable means responsive to the temperature of the air supplied to said space for controlling the temperature of said medium, and means responsive to the temperature in said space for controlling said adjustable means and said rate controlling means.

10. In control apparatus, a plurality of devices to be operated, a follow-up potentiometer for each of said devices, each potentiometer including a resistor, means including an electrical network circuit for controlling the operation of said devices, said network circuit including in series the resistors of said follow up potentiometers for an additional network means comprising a resistor and means for causing an electrical potential across the same connected between one of said follow-up potentiometers and its respective device, and means operated by the said respective device for controlling the said electrical potential.

11. In an aircraft propelled by a power plant including a gas turbine and an air compressor for the same and having a pressurized cabin wherein the air for said cabin is delivered through a conduit from the compressor of said turbine to said cabin, in combination, means for controlling the rate of flow through said conduit, means for controlling the temperature of the air discharged from said conduit into said cabin, and means responsive to the temperature of said cabin for controlling said rate of flow controlling means and said discharge temperature controlling means.

12. In an aircraft propelled by a power plant including an air compressor and having a pressurized cabin wherein the air for the said cabin is delivered through a conduit from the compressor to said cabin, in combination, adjustable means for controlling the rate of flow through said conduit, adjustable means for controlling the temperature of the air discharged from said conduit into said cabin from a predetermined high value to a predetermined low value, and means responsive to the temperature of cabin for adjusting said flow controlling means and said discharge temperature controlling means so that a high rate of flow and an extreme discharge temperature will be required for an extreme temperature in said cabin and so that a minimum rate of air flow will be required for intermediate temperature condition in said cabin.

13. In apparatus for maintaining the temperature of a space within a predetermined range, means for supplying a temperature changing medium to said space, means for controlling the rate of supply of said medium from a predetermined high value to a predetermined lower value, means for controlling the temperature of said medium from an extreme high value above said range to an extreme low value below said range, means responsive to the temperature of said space and operative to adjust said rate of supply means to said high value and said temperature controlling means to an extreme value when the temperature of said space is at an extreme of said range and to adjust said rate of supply means to a lower value when the temperature of said space is at a value intermediate said range.

14. In condition controlling apparatus for a space, means for supplying a condition changing medium to said space, means for controlling the rate of supply of said medium from a predetermined high value to a predetermined lower value, means for controlling a condition of said medium from a predetermined high value to a predetermined lower value, and means responsive to the space condition for adjusting said rate controlling means and said medium condition controlling means to a high rate of supply and an extreme value of the condition of said medium when the condition of said space is at an extreme.

15. In an aircraft propelled by a power plant including a gas turbine and an air compressor for the same and having a pressurized cabin wherein the air for the said cabin is delivered through a conduit means from said compressor to said cabin, in combination, a plurality of means for varying the temperature of the air flowing through said conduit, amplifier means for controlling the operation of said plurality of means, means including an electrical network for controlling said amplifier means, means responsive to the temperature of the discharge air of said conduit means for varying the electrical balance of said network, an additional electrical network circuit for supplementing the first named network in controlling one of said plurality of means, means operated by said one means for controlling said additional network, and means responsive to the temperature in said cabin for adjusting the first named electrical network.

16. In control apparatus, means for supplying a medium to a space, said medium initially having an excess of heat, means for cooling said medium to remove said excess heat, means for controlling said cooling means, means for controlling the rate of supply of said medium to said space, and means responsive to the temperature of said space for regulating said cooling control means and said rate controlling means, said rate of supply being normally maintained at a predetermined value and increased upon either excessively low or high space temperatures.

17. In control apparatus for a space, means for supplying a condition changing medium to said space, means for varying the condition changing ability of said medium between predetermined limits, and means for regulating the rate of supply of said medium to a predetermined value when the condition changing ability of said medium is intermediate said limits and changing said rate of supply to a different value when said condition changing ability is at either of said limits.

HUBERT T. SPARROW.

REFERENCES CITED

The following references are of record in the file of this patent:

UNITED STATES PATENTS

| Number | Name | Date |
| --- | --- | --- |
| 2,168,680 | Nordgren | Aug. 8, 1939 |
| 2,180,764 | Nessell | Nov. 21, 1939 |
| 2,266,238 | Newton | Dec. 16, 1941 |
| 2,293,557 | Newton | Aug. 18, 1942 |
| 2,337,410 | Peters | Dec. 21, 1943 |
| 2,408,699 | Sparrow | Oct. 1, 1946 |
| 2,412,110 | Williams | Dec. 3, 1946 |